Figure 4:
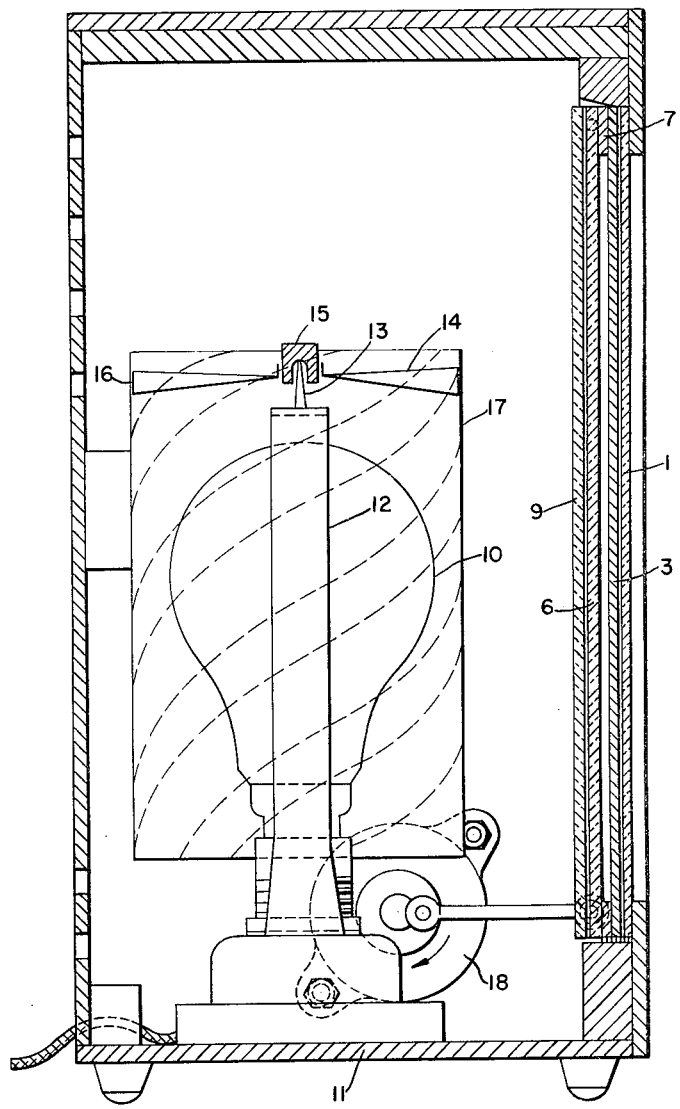

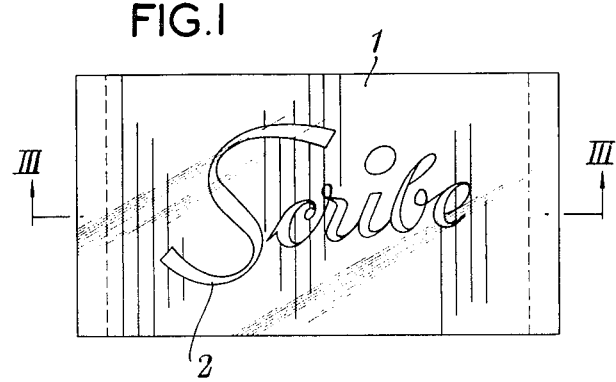
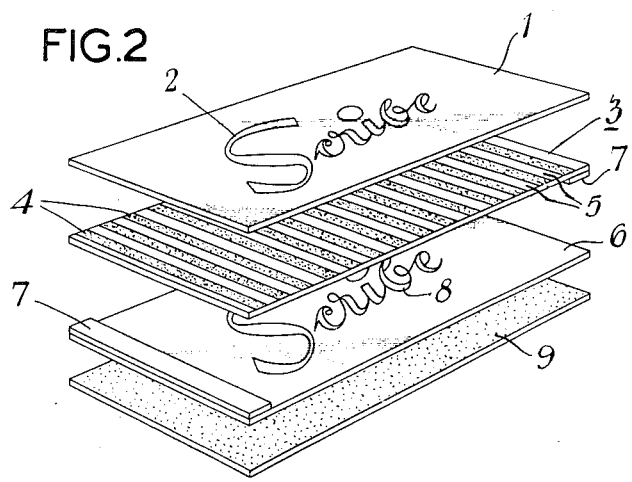
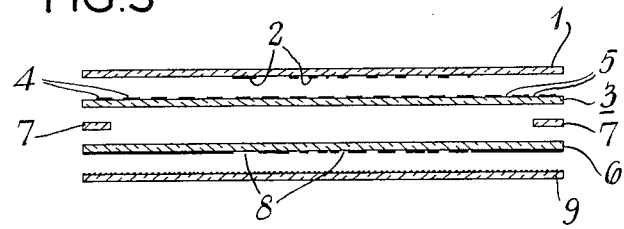

Sept. 14, 1965  M. GROSSE  3,205,598
DEVICES FOR THE PRODUCTION OF MULTIPLE IMAGES
Filed April 5, 1963  2 Sheets-Sheet 2

INVENTOR.
Maurice Grosse
BY
Mawkinney & Mawkinney
ATTORNEYS

United States Patent Office 3,205,598
Patented Sept. 14, 1965

3,205,598
DEVICES FOR THE PRODUCTION OF
MULTIPLE IMAGES
Maurice Grosse, London, England, assignor of one-half
to Alexander Carson, Stanmore, Middlesex, England
Filed Apr. 5, 1963, Ser. No. 270,980
Claims priority, application Great Britain, Apr. 11, 1962,
13,987/62
14 Claims. (Cl. 40—106.52)

This invention relates to devices for the production of multiple images.

An object of the invention is the provision of a simple display device usable for purposes such as advertising, the device being capable of producing multiple images of, for example, an advertising slogan, in a manner calculated to catch the eye.

According to the invention, there is provided a device for the production of multiple images comprising a sheet of glass or other transparent material provided with a plurality of relatively small separate or interconnected mirrored regions interspersed by a plurality of relatively small separate or interconnected unmirrored transparent regions, a non-transparent reflecting surface spaced rearwardly of the said sheet and facing the mirrored regions thereof, indicia arranged on, in, or in front of the reflecting surface and/or behind gaps in the surface so as to be visible therethrough and a source of daylight or artificial light adapted to illuminate said indicia, the arrangement being such that a viewer facing the front of the illuminated device can see the indicia together with a striped, dotted or other discontinuous infinite multiple image thereof, and such that relative movement between the viewer and the device produces the illusion of flickering of the said multiple image.

For a better understanding of the invention, and to show how the same may be carried into effect, reference will now be made, by way of example, to the accompanying drawings, in which:

FIGURE 1 is a front elevation of a device in accordance with the invention,

FIGURE 2 is a perspective "exploded" view showing the various parts of the device of FIGURE 1, FIGURE 3 is a section taken on the line III—III of FIGURE 1, the parts again being shown in "exploded" relationship with certain features exaggerated in thickness or width for the sake of clarity, and FIGURE 4 is a view primarily in vertical section showing the invention as employed at the front of a substantially lightproof cabinet.

Referring to the drawings, the device takes the form of a sign which is intended to be hung in a position in which the indicia forming part thereof will be illuminated by daylight. The front of the device is afforded by flat sheet of plain glass 1 having secured to its rear surface semi-transparent colored material 2 shaped to form the word "Scribe." A second sheet of glass 3 lies immediately behind the sheet 1 and is formed on its front surface with a large number of rearwardly facing small mirrored regions. As can be seen in FIGURES 2 and 3, each such region takes the form of a stripe 4, the stripes 4 being spaced from one another by unmirrored transparent regions in the form of further stripes 5 having widths similar to those of the stripes 4. The stripes 4 and 5 are, in fact, shown in the drawings as having a width greater than that actually employed in practice. Relatively small circular dots or the like may take the place of the stripes 4, the dots being spaced from one another by interconnected unmirrored transparent regions. The precise formation of the mirrored and unmirrored regions is not, in fact, of great importance, provided that these regions, whether interconnected or not, are each small relative to the total area of the sheet of glass 3. The total area of the mirrored regions, such as the stripes 4, is preferably very approximately equal to the total area of the unmirrored regions, such as the stripes 5. The formation of the partially mirrored sheet of glass 3 which has just been described is known per se and, accordingly, it is not necessary to describe the way in which such a sheet is made.

A reflecting surface in the form of a conventional flat mirror 6 is provided behind the sheet of glass 3, the mirror 6 being spaced from the sheet of glass by plain glass spacing strips 7. The mirror 6 is formed with gaps 8 in its silvering, these gaps being arranged to form the word "Scribe" and to register with the material 2 forming the same word on the back of the sheet of glass 1. A sheet of frosted glass 9 is disposed behind the gaps 8 in the silvering of the mirror 6, said gaps, together with the frosting on the sheet of glass 9 which is visible therethrough, forming the indicia intended to catch the eye of potential buyers of the product being advertised. If desired, the gaps 8 may be backed by a semitransparent colored material such as sheets of colored paper or plastic.

When the sign afforded by the device is hung or otherwise erected in a place where its rear will be illuminated by daylight, a viewer of the front of the device will see the illuminated indicia together with a discontinuous infinite multiple image thereof. The image will be striped, dotted or the like in accordance with the form of distribution of the mirrored regions of the partially mirrored sheet of glass 3. The multiple image gives an illusion of depth or solidity to the indicia, an infinite number of images being formed one behind the other due to the fact that the mirrored regions 4 of the sheet of glass 3 face the reflecting surface afforded by the mirror 6 placed behind it. The viewer can see the indicia and the multiple images thereof through the unmirrored regions of the partially mirrored sheet of glass 3. In fact, of course, only a certain number of the infinite multiple images are visible in dependence upon the quality of the reflecting surfaces employed and upon the strength of the light illuminating the indicia.

Upon a viewer moving relative to the device, or vice versa, the multiple images will appear to flicker. This is due to different mirrored regions 4 of the partially mirrored sheet of glass 3 becoming effective as the position of the viewer relative to the indicia changes. Although the gaps 8 are spaced from the stripes 4 by the combined thickness of the parts 3 and 6, it is preferred to provide the spacing strips 7 since the greater spacing enhances the flickering effect. It will be apparent that, in fact, the front sheet of glass 1 having indicia afforded by the material 2 does not form an essential part of the device. It is, however, preferred to provide it since the indicia afforded by the material 2 will always be visible to the viewer regardless of the power of the light illuminating the rear of the device. It is not essential to include the sheet of frosted glass 9 but, once again, it is preferred to do so since this sheet of glass protects the silvering of the mirror 6 and improves the quality of the multiple image which is produced by diffusing the light which illuminates the indicia.

Obviously, a source of artificial light such as one or more electric light bulbs 10 may be used to illuminate the indicia instead of daylight. A device similar to that which has just been described may form the front of a substantially lightproof cabinet 11 as in FIGURE 4, the interior of the cabinet being occupied by the said electric light bulb or bulbs 10. To increase the capacity of the device to catch the eye of a viewer, the electric light bulb or bulbs may be switched on and off every few seconds by means of an automatic thermally operated circuit breaker or the like of known construction. When a strong source of light is used, it is usually preferable to back the illuminated indicia by a layer of plain or coloured light-diffusing material, such as paper.

An additional flickering effect can be imparted to the multiple image of the indicia in a simple manner by mounting a bracket 12 adjacent the, or each, light bulb 10, the bracket supporting a vertical pivot 13 immediately above the bulb. The said pivot affords the axis of rotation of a member 14 of the kind which is known as a "spinner." The spinner takes the form of a circular metal disc having a central bearing 15 which can be slipped over the aforementioned pivot for co-operation therewith and a plurality of radial slots one edge of each of which is bent upwardly out of the general plane of the disc to form an inclined vane. As is well known per se, the upwardly moving convection current of air which is caused by the heat of the electric light bulb when the same is switched on strikes the vanes of the spinner and causes the latter to rotate about the pivot in a direction dependent upon the direction of inclination of all the vanes.

The circumferential edge of the spinner 14 is secured as at 16 to a circular cylindrical member 17 which is of such a size that it is disposed substantially concentrically around a major part of the electric light bulb 10 so that a region of this member always lies between the light bulb and a viewer of the device. The circular cylindrical member 17 is formed with a plurality of vertically or helically extending slots which are laterally spaced relative to one another by semi-transparent elements having an angular extent approximately equal to that of the slots, the elements being formed from different coloured synthetic plastic materials. If desired, the elements may be attached to a circular cylinder formed from a transparent plastic material so that the slots will be omitted.

In operation of the device, the spinner 14 rotates the attached circular cylindrical member 17 so that the elements pass continuously between the light bulb 10 and a viewer. This causes the multiple images which the viewer seeks to fluctuate in brightness or to flicker. A degree of continuous colour variation is also given to the multiple images of the indicia as well as a flickering effect due to the differently coloured semi-transparent synthetic plastic elements. If desired, the colour variation may be omitted by forming the elements from opaque material such as metal. In order to ensure free flow of the stream of air which rotates the spinner the rear panel of the cabinet is formed with lower and upper groups of slots for the entry and exit of air respectively. It is sometimes necessary to start the spinner rotating by hand and this can be done by temporarily removing the rear panel 15 of the cabinet. However, any tendency for the spinner to stick is alleviated by applying a solid lubricant, such as graphite or molybdenum di-sulphide, to the pivot 13 of the spinner 14. When more than one bulb 10 is provided together with more than one spinner, the spinners may be arranged to rotate in relatively opposite directions. The rear of the cabinet may be provided with mirrors arranged to reflect the light which falls upon them towards the indicia disposed in front of the light bulb 10 or bulbs and the spinner 14 or spinners.

Although it is convenient to effect movements of the semi-opaque or opaque elements in the manner which has been described, since this method makes the provision of a separate source of power for driving the said elements entirely unnecessary, the elements may, if desired, be passed between the source of light and a viewer by mechanical means 18 such as, for example, a small electric motor and speed reduction gear. The small electric motor may drive an endless chain or belt around two gear wheels or pulleys arranged on relatively opposite sides of the source of light, the said chain or belt carrying the semi-opaque or opaque elements which are arranged to pass continuously between the source of light and a viewer. In some cases, the same electric motor may conveniently be used to effect continuous movement of the indicia such as, for example, when the latter take the form of an advertising slogan on an endless band or the like.

If desired, means, such as a small electric motor 18, may be provided to produce relative motion between the partially mirrored sheet of glass 3 and the conventional mirror 6 or other reflecting surface disposed behind it. The multiple image which is produced will appear to move when this construction is employed, the form of the movement being dependent upon the manner in which the electric motor 18 or the like is connected to produce the said relative motion. Naturally, if desired, for certain purposes, the arrangement may conveniently be such that the relative motion can be produced manually.

It will be evident that the indicia may take a variety of different forms. For example, instead of being afforded principally by the gaps 8 in the silvering of the conventional mirror 6, the indicia may be disposed between the rear of the partially mirrored sheet of glass 3 and the front of the conventional mirror 6. In this case, they may be of solid transparent or semi-transparent construction, the sources of light being afforded by filaments contained within the indicia themselves. In such a case, the provision of an electric light bulb or other source of light within a substantially lightproof cabinet is unnecessary. When the indicia themselves are of solid construction, the illusion of solidity afforded by the superposed multiple images is enhanced. Another method of forming the indicia is by engraving or etching the conventional mirror 6 or other reflecting surface instead of leaving gaps 8 therein. A source of artificial light must be employed when this construction is used.

The reflecting surface to the rear of the partially mirrored sheet of glass 3 need not necessarily be afforded by a conventional mirror but may, if desired, be comprised by a sheet of highly polished metal or other material having good reflecting properties. The, or each, source of artificial light 10 conveniently takes the form of an electric light bulb or the like but fluorescent lighting, gas lighting or other forms of artificial light can equally well be employed. The partially mirrored sheet of glass 3 and the reflecting surface to the rear thereof need not necessarily be flat and can, for particular purposes, be concave, convex or of irregular formation.

We claim:

1. A device for the production of multiple images comprising a sheet of transparent material provided with a plurality of relatively small mirrored regions interspersed by a plurality of relatively small unmirrored transparent regions, a non-transparent reflecting surface spaced rearwardly of the said sheet and facing the mirrored regions thereof, indicia associated with the reflecting surface and a source of light adapted to illuminate the indicia, whereby a viewer facing the front of the illuminated device can see the indicia together with a discontinuous infinite multiple image thereof, and whereby relative movement between the viewer and the device produces the illusion of flickering of the said multiple image.

2. A device as claimed in claim 1, wherein the reflecting surface is afforded by a plain mirror.

3. A device as claimed in claim 1, wherein the indicia is afforded at least partly by gaps formed in the reflecting surface.

4. A device as claimed in claim 1, wherein both the mirrored and un-mirrored regions are of striped formation.

5. A device as claimed in claim 1, wherein the total area of the mirrored regions is approximately equal to the total area of the un-mirrored regions.

6. A device as claimed in claim 1, wherein the reflecting surface is spaced rearwardly of said sheet by transparent spacing strips.

7. A device as claimed in claim 1, wherein a further sheet of transparent material is provided in front of the first-mentioned sheet, said further sheet carrying indicia arranged to register with the first-mentioned indicia.

8. A device as claimed in claim 1, wherein a sheet of light-diffusing transparent material is arranged behind the reflecting surface in register with gaps formed in that surface.

9. A device as claimed in claim 1, and forming at least part of the front of a substantially light-proof cabinet, said cabinet containing at least one source of artificial light.

10. A device as claimed in claim 9, wherein the source of artificial light is provided with means to produce a continuous variation of the multiple image seen by a viewer of the device in the use thereof.

11. A device as claimed in claim 10, wherein the source of light is an electric light bulb, and wherein said means includes a spinner arranged to be driven by the convection air current produced by the said bulb when the same is illuminated.

12. A device as claimed in claim 1, wherein the reflecting surface and the sheet of transparent material are of flat formation.

13. A device as claimed in claim 1, and including power-operated means to produce relative motion between said sheet and the reflecting surface.

14. A device for the production of multiple images comprising a sheet of transparent material provided with a plurality of relatively small mirrored regions interspersed by a plurality of relatively small un-mirrored transparent regions, a non-transparent reflecting surface spaced rearwardly of the said sheet and facing the mirrored regions thereof, and indicia associated with the reflecting surface and adapted to be illuminated by a source of light, so that a viewer facing the front of the illuminated device can see the indicia together with a discontinuous infinite multiple image thereof, and so that relative movement between the viewer and the device produces the illusion of flickering of the said multiple image.

References Cited by the Examiner

UNITED STATES PATENTS 1,202,593    10/16    Scott _____ 88—1
2,114,711    4/38    Horinstein _____ 40—219

FOREIGN PATENTS 9,077    4/12    Great Britain.

EUGENE R. CAPOZIO, *Primary Examiner.*

JEROME SCHNALL, *Examiner.*